(12) United States Patent
Miyazaki

(10) Patent No.: US 8,181,235 B2
(45) Date of Patent: May 15, 2012

(54) AUTHENTICATION DEVICE, SERVER SYSTEM, AND METHOD OF AUTHENTICATING SERVER BETWEEN A PLURALITY OF CELLS AND AUTHENTICATION PROGRAM THEREOF

(75) Inventor: Jun Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 229 days.

(21) Appl. No.: 12/753,210

(22) Filed: Apr. 2, 2010

(65) Prior Publication Data
US 2010/0257597 A1   Oct. 7, 2010

(30) Foreign Application Priority Data

Apr. 3, 2009  (JP) .................................. 2009-090786

(51) Int. Cl.
*G06F 21/00* (2006.01)
(52) U.S. Cl. .......................................................... 726/8
(58) Field of Classification Search ........................ 726/8
See application file for complete search history.

(56) References Cited

U.S. PATENT DOCUMENTS

| | | | | |
|---|---|---|---|---|
| 7,364,087 | B2* | 4/2008 | Zimmer et al. ................ | 235/492 |
| 2003/0158945 | A1* | 8/2003 | Liu ............................... | 709/227 |
| 2005/0028000 | A1* | 2/2005 | Bulusu et al. ................. | 713/200 |
| 2005/0242925 | A1* | 11/2005 | Zaretsky et al. ............. | 340/10.1 |
| 2005/0271079 | A1* | 12/2005 | Teoh .............................. | 370/463 |
| 2006/0218631 | A1* | 9/2006 | Shih et al. ......................... | 726/8 |
| 2007/0130481 | A1* | 6/2007 | Takahashi et al. ............. | 713/300 |
| 2007/0204332 | A1* | 8/2007 | Pan .................................... | 726/5 |
| 2010/0281246 | A1* | 11/2010 | Bristow et al. ................ | 713/100 |
| 2011/0202983 | A1* | 8/2011 | Pope et al. ......................... | 726/7 |

FOREIGN PATENT DOCUMENTS

| | | |
|---|---|---|
| JP | 9-50422 A | 2/1997 |
| JP | 2002335239 A | 11/2002 |
| JP | 2006260201 A | 9/2006 |
| JP | 2009122789 A | 6/2009 |
| WO | 0101656 A | 1/2001 |

OTHER PUBLICATIONS

Japanese Office Action for JP2009-090786 issued Jan. 12, 2011.

* cited by examiner

*Primary Examiner* — Nasser Goodarzi
*Assistant Examiner* — Lisa Lewis

(57) ABSTRACT

Intended is to realize, in a server system operating on at least one BMC board mounted on each of a plurality of cell boxes, single sign-on with respect to an access from system management software or a client terminal. An authentication device of a server system 1 formed of at least one Web server 112 operable on baseboard management controllers 110 and 120 mounted on a cell box 10, which device includes a storage unit 70 in which authentication information is held, and an authentication management unit 140 which holds an authentication result of a client to be authenticated or an account to be authenticated in the storage unit 70 and synchronizes the authentication information between the Web servers to skip the authentication in a hyperlink access between the Web servers.

10 Claims, 7 Drawing Sheets

| MANAGEMENT LEVEL | USER ACCOUNT | PASSWORD | USER AUTHORIZATION |
|---|---|---|---|
| PARTITION #0 BMFW·WEB SERVER | Administrator | — | Administrator |
| | User1 | — | Operator |
| | ⋮ | — | ⋮ |
| | User8 | — | Operator |
| PARTITION #1 BMFW·WEB SERVER | Administrator | — | Administrator |
| | User1 | — | Operator |
| | ⋮ | — | ⋮ |
| | User8 | — | Operator |
| PARTITION #n BMFW·WEB SERVER | Administrator | — | Administrator |
| | User1 | — | Operator |
| | ⋮ | — | ⋮ |
| | User8 | — | Operator |

(b)

| MANAGEMENT LEVEL | USER ACCOUNT | AUTHENTICATION CODE |
|---|---|---|
| PARTITION #0 BMFW·WEB SERVER | Administrator | 01234… |
| | User1 | 12345… |
| | ⋮ | |
| | User8 | 23456… |
| PARTITION #1 BMFW·WEB SERVER | Administrator | 34567… |
| | User1 | 45678… |
| | ⋮ | |
| | User8 | |
| PARTITION #n BMFW·WEB SERVER | Administrator | 56789… |
| | User1 | 6789A… |
| | ⋮ | |
| | User8 | 789AB… |

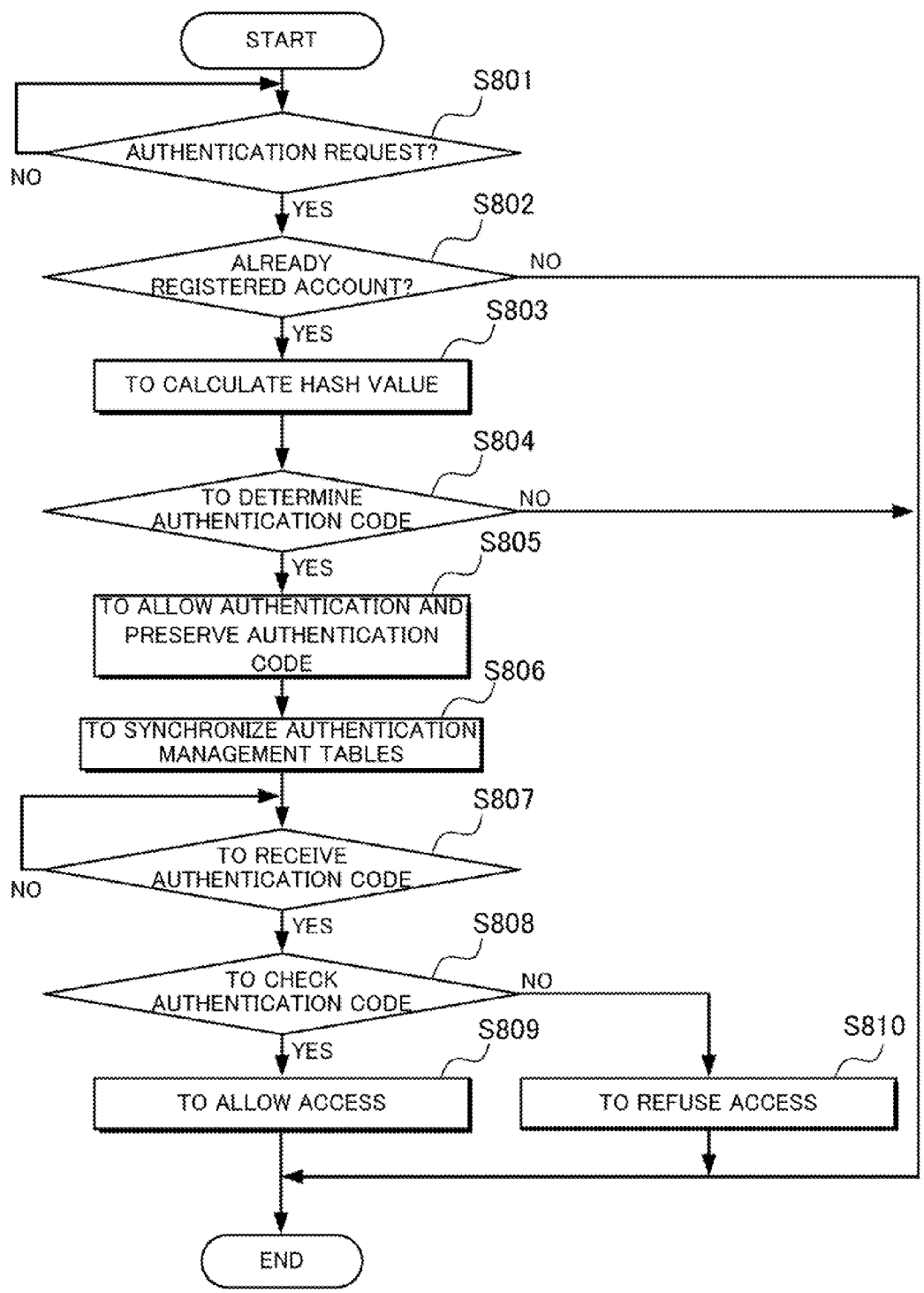

AUTHENTICATION DEVICE, SERVER SYSTEM, AND METHOD OF AUTHENTICATING SERVER BETWEEN A PLURALITY OF CELLS AND AUTHENTICATION PROGRAM THEREOF

INCORPORATION BY REFERENCE

This application is based upon and claims the benefit of priority from Japanese patent application No. 2009-090786, filed on Apr. 3, 2009, the disclosure of which is incorporated herein in its entirety by reference.

TECHNICAL FIELD

The present invention relates to an authentication device, a server system, a method of authenticating a server between a plurality of cells and an authentication program thereof and, more particularly, a technique suitably used for a server system formed of at least one Web (World Wide Web) server operable on a baseboard management controller (BMC) mounted on a cell box.

BACKGROUND ART

Known as a function which enables a user to use all the allowed functions only by one time authentication is single sign-on (hereinafter simply referred to as SSO). In a case, for example, where a terminal connected to a network is used, while such a situation possibly occurs that a user is forced to input his/her ID and password many times such as each time at the start-up of the terminal, at the time of connection to a LAN (Local Area Network), at the time of connection to a server and at the start-up of an application of the server, the SSO is the function of saving user's labor required in such a situation and skipping all the user authentications once he/she is authenticated.

Proposed in Patent Literature 1, for example, are an SSO authentication method which realizes SSO without requiring an authentication state management server that executes centralized management of an authentication condition, thereby mitigating system setting up costs and operation management costs, and a system thereof.

Patent Literature 1: Japanese Patent Laying-Open No. 2002-335239.

On the other hand, known is a server system formed of a symmetric multiple processor (SMP) in which with a plurality of baseboard management controllers (hereinafter, referred to as a BMC board) mounted in a cell box including a CPU module including a memory and an input/output module, a BMC firmware operable on a BMC and a Web server operable on a BMC operate on the BMC board.

In the above-described server system, for system management software of a host device or a client terminal connected via a network to access a BMC board in charge of platform management, log-in (authentication) to the BMC is required. In this case, in a partition system in which a cell box is divided into partitions or which is formed of a plurality of cell boxes, access authentication is required for each BMC board.

In a case where a Web client makes a hyperlink access by HTTP (Hyper Text Transfer Protocol) bridging over Web servers equipped with basic authentication, each access to each Web server needs log-in (authentication). The above-described Patent Literature 1 lacks a countermeasure against it.

OBJECT OF THE INVENTION

An object of the present invention is to provide an authentication device, a server system, a method of authenticating a server between a plurality of cells and an authentication program thereof which realize, in a server system operating on at least one BMC board mounted on each of a plurality of cell boxes, single sign-on with respect to an access from system management software or a client terminal.

SUMMARY

According to a first exemplary aspect of the invention, an authentication device of a server system including at least one Web server operable on a baseboard management controller mounted on a cell box, includes a storage unit in which authentication information is held, and an authentication management unit which holds an authentication result of a client to be authenticated or an account to be authenticated in the storage unit and synchronizes the authentication information between the Web servers to skip the authentication in a hyperlink access between the Web servers.

According to a second exemplary aspect of the invention, a server system, includes a host device which executes platform control through authentication, a client terminal which accesses a Web server, and a Web server operable on a baseboard management controller mounted on a cell box connected with the host device and the client terminal via a network, wherein the baseboard management controller includes a storage unit in which authentication information is held, and an authentication management unit which holds an authentication result of a client to be authenticated or an account to be authenticated in the storage unit and synchronizes the authentication information between the Web servers to skip the authentication in a hyperlink access between the Web servers.

According to a third exemplary aspect of the invention, a method of authenticating a server between a plurality of cells in a server system including a host device which executes platform control, a client terminal which accesses a Web server, and a Web server operable on a baseboard management controller mounted on a cell box connected with the host device and the client terminal via a network, includes a requesting step of issuing an access request to the baseboard management controller or Web server by the host device or client terminal, a synchronization step of holding an authentication result of a client to be authenticated or an account to be authenticated to synchronize the authentication information between the Web servers by the baseboard management controller, and an authentication management step of skipping the authentication in a hyperlink access between the Web servers by the baseboard management controller.

According to a fourth exemplary aspect of the invention, an authentication program for authenticating a server between a plurality of cells in a server system including a host device which executes platform control, a client terminal which accesses a Web server, and at least one Web server operable on a baseboard management controller mounted on a cell box connected with the host device and the client terminal, which causes a computer to execute a synchronization processing of holding an authentication result of a client to be authenticated or an account to be authenticated to synchronize the authentication information between the Web servers, and an authentication management processing of skipping the authentication in a hyperlink access between the Web servers.

According to the present invention, it is possible to provide an authentication device, a server system, a method of authenticating a server between a plurality of cells and an authentication program thereof which realize, in a server system operating on at least one BMC board mounted on each of a plurality of cell boxes, single sign-on with respect to an access from system management software or a client terminal.

The reason is that the BMC board holds an authentication result of a client to be authenticated or an account to be authenticated, executes synchronization of authentication information between Web servers and executes authentication management processing of skipping authentication in a hyperlink access between the Web servers.

BRIEF DESCRIPTION OF THE DRAWINGS

FIG. 7 is a diagram showing one example of a data structure of a user management table and an authentication code management table of the authentication device according to the first exemplary embodiment of the present invention; and FIG. 8 is a flow chart showing operation of the authentication device according to the first exemplary embodiment of the present invention.

EXEMPLARY EMBODIMENT

Next, an exemplary embodiment of the present invention will be described in detail with reference to the drawings.

Stricture of First Exemplary Embodiment

Figure 1:
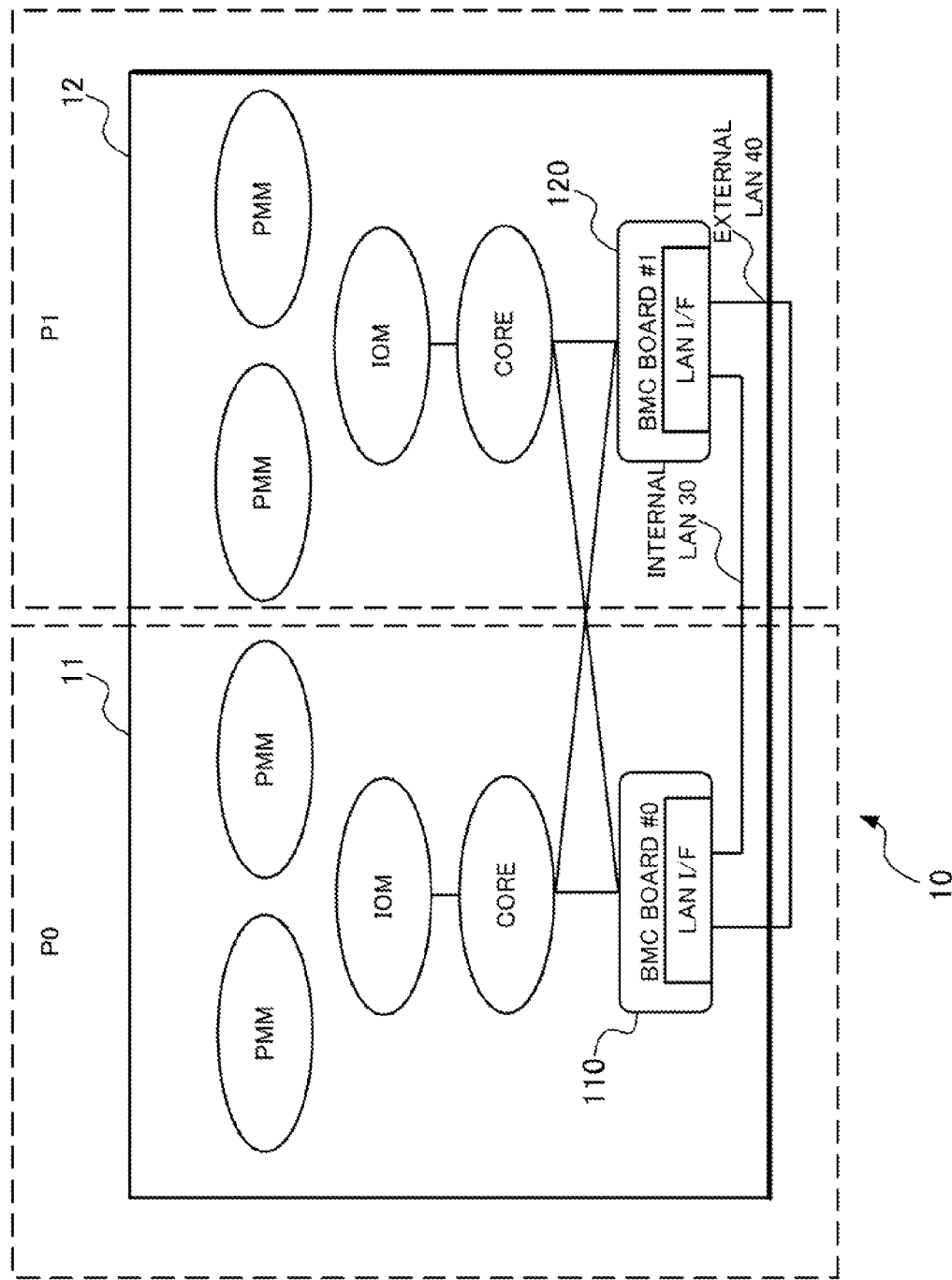
FIG. 1 is a block diagram showing a structure of a cell box for use in a server system according to a first exemplary embodiment of the present invention.
Figure 2:
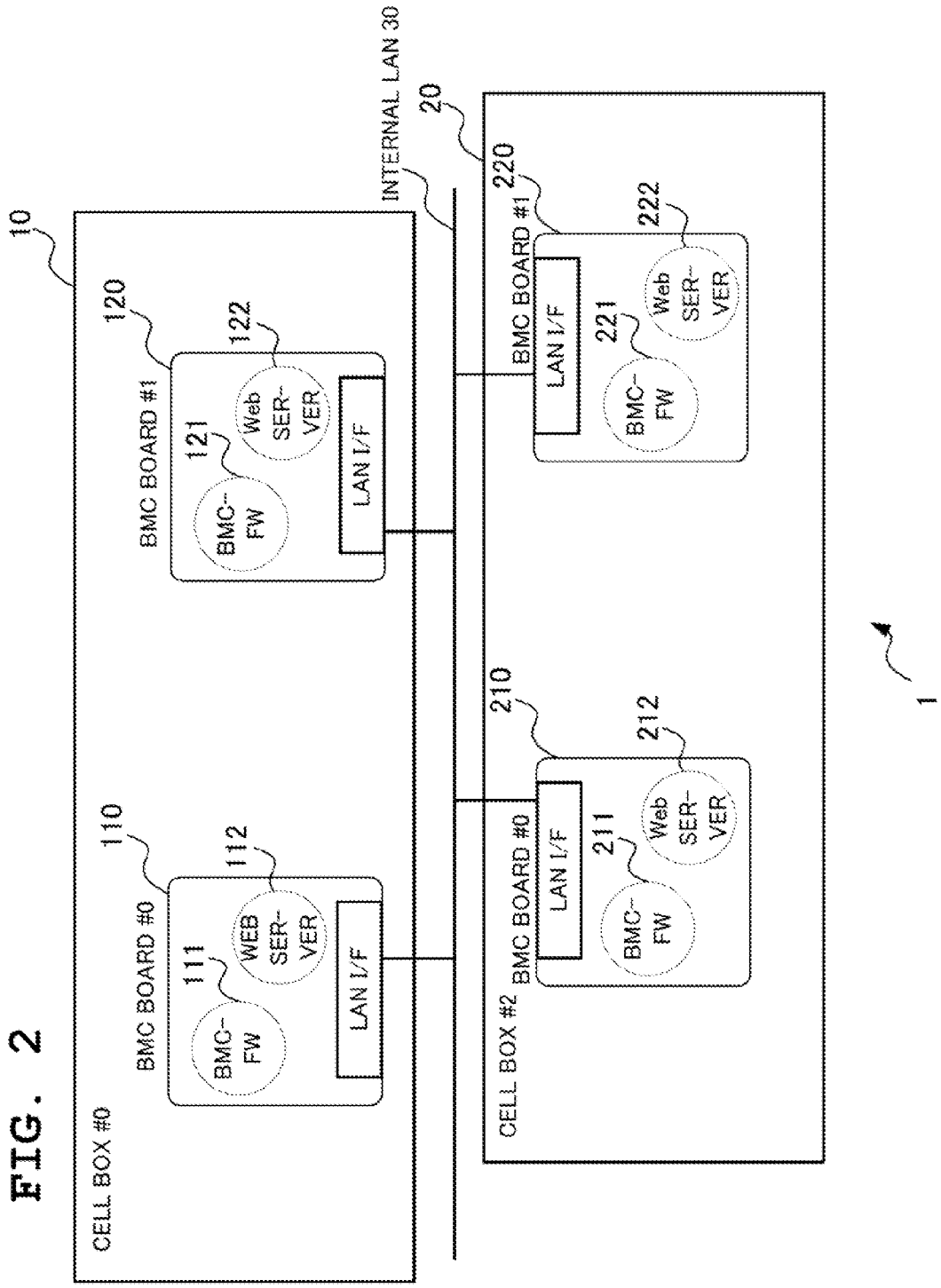
FIG. 2 is a block diagram showing a structure of the server system according to the first exemplary embodiment of the present invention.

FIG. 1 is a block diagram showing a structure of a cell box for use in a server system 1 according to a first exemplary embodiment of the present invention and FIG. 2 is a block diagram showing a structure of the server system 1 according to the first exemplary embodiment of the present invention.

With reference to FIG. 1, illustrated in the present exemplary as a cell box 10 is a 2-hardware cell box 11, 12 separated into two partitions P0 and P1. Here, BMC boards #0 (110) and #1(120) are mounted on the partitions P0 and P1, respectively. The BMC boards #0(110) and #1(120) are connected via an internal LAN 30 and an external LAN 40 through their contained LAN interfaces.

With reference to FIG. 2, mounted on the BMC board #0(110) are a BMC firmware (BMC-FW 111) which manages and controls the partition P0 and a Web server 112 in charge of platform management and control in a hyperlink access from a Web client not shown. Mounted on the BMC board #1(120) are a BMC firmware 121 which manages and controls the partition P1 and a Web server 122 in charge of platform management and control in a hyperlink access from a Web client not shown.

Among modules forming each of the partitions P0 and P1 are four, memory modules (PMM) including a CPU, an input/output module (IOM) and a core module (Core), and the BMC firmware 111 and 121 in the same cell box and the BMC firmware 211 and 221 in other cell box communicate through the internal LAN 30 hidden from outside as shown in FIG. 1. Even in a case where the system is formed of a plurality of cell boxes, the respective cell boxes are allowed to communicate with each other by using the internal LAN 30.

Figure 3:
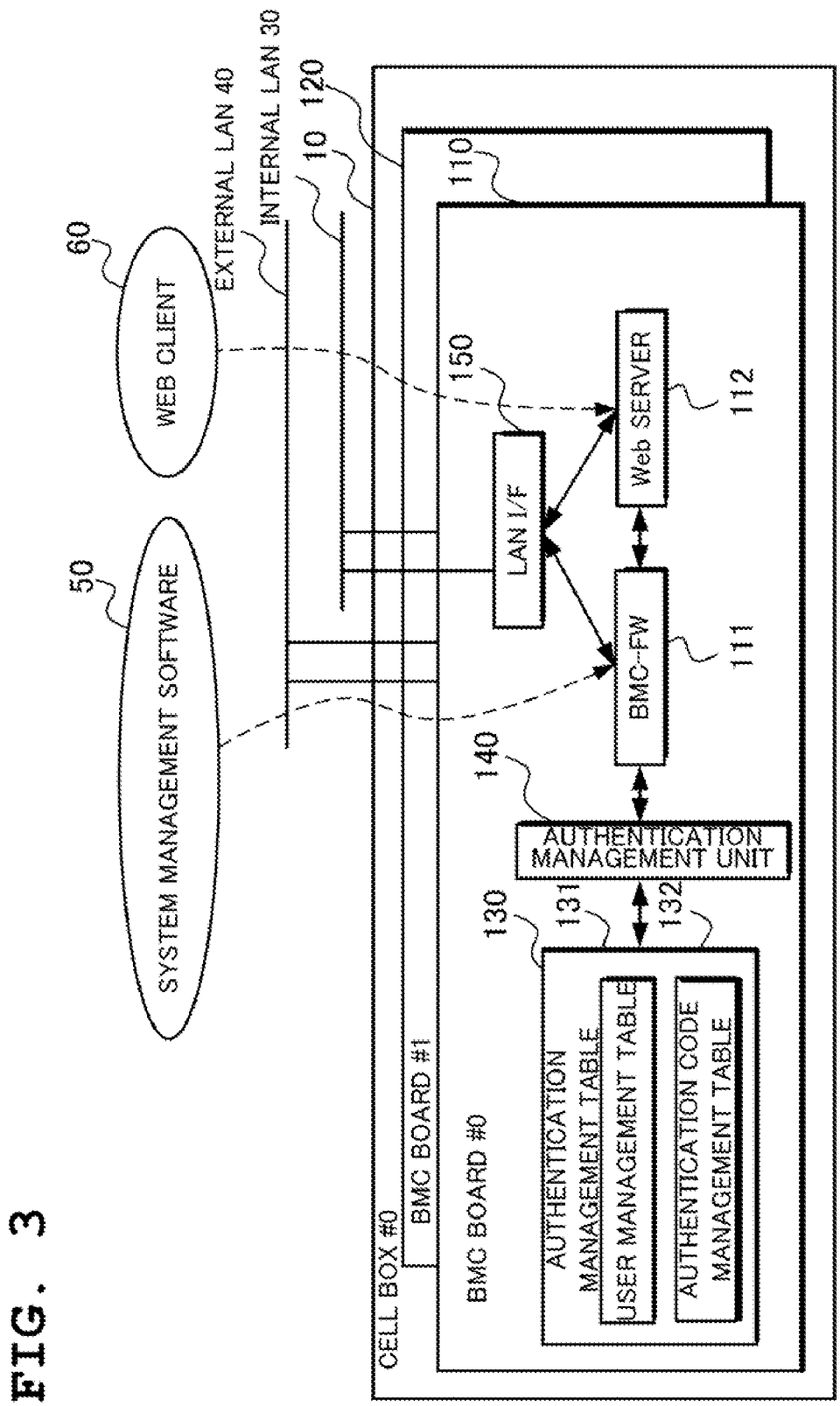
FIG. 3 is a block diagram showing a structure of an authentication device according to the first exemplary embodiment of the present invention.

FIG. 3 is a block diagram showing a structure of an authentication device according to the first exemplary embodiment of the present invention, in which illustrated is an example where the authentication device is mounted on the BMC board #0(110) of the cell box #0(10).

As shown in FIG. 3, for functioning as an authentication device, the BMC board 110 has an authentication management table 130 assigned and stored in a predetermined region of a storage unit 70 and further has an authentication management unit 140 added. The authentication management table is sectioned into a user management table 131 whose data structure is shown as one example in FIG. 7(a) and an authentication code management table 132 whose data structure is shown as one example in FIG. 7(b).

As shown in FIG. 7(a), preserved in the user management table 131 on a partition basis are a user account, a password corresponding to a user account and privileged level information. As the present information, a default account and a password are registered on a partition basis in advance, which can be added by a system management software 50 and a Web client 60. The system management software 50 and the Web client 60 access the BMC firmware 111 or the Web server 112 by using the same user account and password registered in the user management table 131.

With reference to FIG. 7(b), registered in the authentication code management table 132 on a partition basis are a user account corresponding to a user, and an authentication code which is a hash value formed from a password and an authentication key including a random value.

Return the description to FIG. 3. In FIG. 3, for executing platform control, the system management software 50 mounted on a host device not shown and the Web client 60 operable on a client terminal not shown access the BMC firmware 111 or the Web server 112, and a user account, a password or privileged level information for limiting operation which are used at this time are stored in the user management table 131 of the authentication management table 130.

The system management software 50 is allowed to execute platform control through authentication to the BMC firmware 111 issued via the external LAN 40 and a LAN interface 150. The Web client 60 is allowed to execute platform control through authentication to the Web server 112 via the external LAN 40 and the LAN interface 150.

When the system management software 50 executes authentication to the BMC firmware 111 via the external LAN 40 and the LAN interface 150, the BMC firmware 111 preserves user information (user account, a password and a privileged level) transmitted from the system management software 50 through the authentication management unit 140 in the user management table 131 of the authentication management table 130 in advance. Then, provided is a function of determining whether it is appropriate user account information already registered or not and when determining that it is an unauthorized access, refusing the access.

When the Web client 60 executes authentication to the Web server 112 via the external LAN 40 and the LAN interface 150 (authenticates by using an authentication page in the Web server 112), the Web server 112 preserves user information (user account, a password and a privileged level) transmitted from the Web client 60 through the BMC firmware 111 and the authentication management unit 140 in the user management table 131 of the authentication management table 130 in advance. Then, provided is a function of determining whether it is appropriate user account information already registered and when determining that it is an unauthorized access, refusing the access.

In the authentication management table 130, a user account, a password corresponding to the user account, and privileged level information are preserved. At a request for issuing an authentication key from the system management software 50 and the Web client 60, the authentication management unit 140 generates an authentication key (hash value) and returns the authentication key.

At the time of making a request for authentication to the BMC firmware 111 or the Web server 112 (or at the time of transmission of a user account and a password to the Web server 112 on a Web authentication page), the system management software 50 and the Web client 60 calculate a hash value from a user account, a password and an authentication key obtained at the time of requesting authentication key issuance (or at the time of issuing a GET request to a Web authentication page) and transmit an authentication code (hash value) together with the user account and the password at the time of authentication to the BMC firmware 111 or the Web server.

At the time of an authentication request, the authentication management unit 140 calculates a hash value by using registered user account and password and the authentication key returned at the time of the authentication request and when the value is the same as the authentication code transmitted by the system management software 50 and the Web client 60 at the time of the authentication request, allows authentication. At the same time, preserve an authentication code corresponding to the registered user in the authentication code management table 132. It is assumed that at the time of an authentication request to the Web server 112, the Web server 112 executes authentication by means of the authentication management unit 140 through the BMC firmware 111.

When the determination is made that the authentication code is appropriate, the authentication management unit 140 uses an authentication code registration unit 143 to store the code in the authentication code management table 132 of the authentication management table 130. After the generation of the authentication code, the authentication management unit 140 issues an authentication code synchronization request to the BMC firmware 121 on other BMC board 120 via the LAN interface 150 and the internal LAN 30 to execute synchronization of the authentication code management table 132 in the authentication management table 130 on each BMC board. When the authentication code is yet to be registered to determine that it is not an appropriate authentication code, return an error to the authentication request to allow no log-in to the BMC firmware 111 or the Web server 112.

Figure 4:
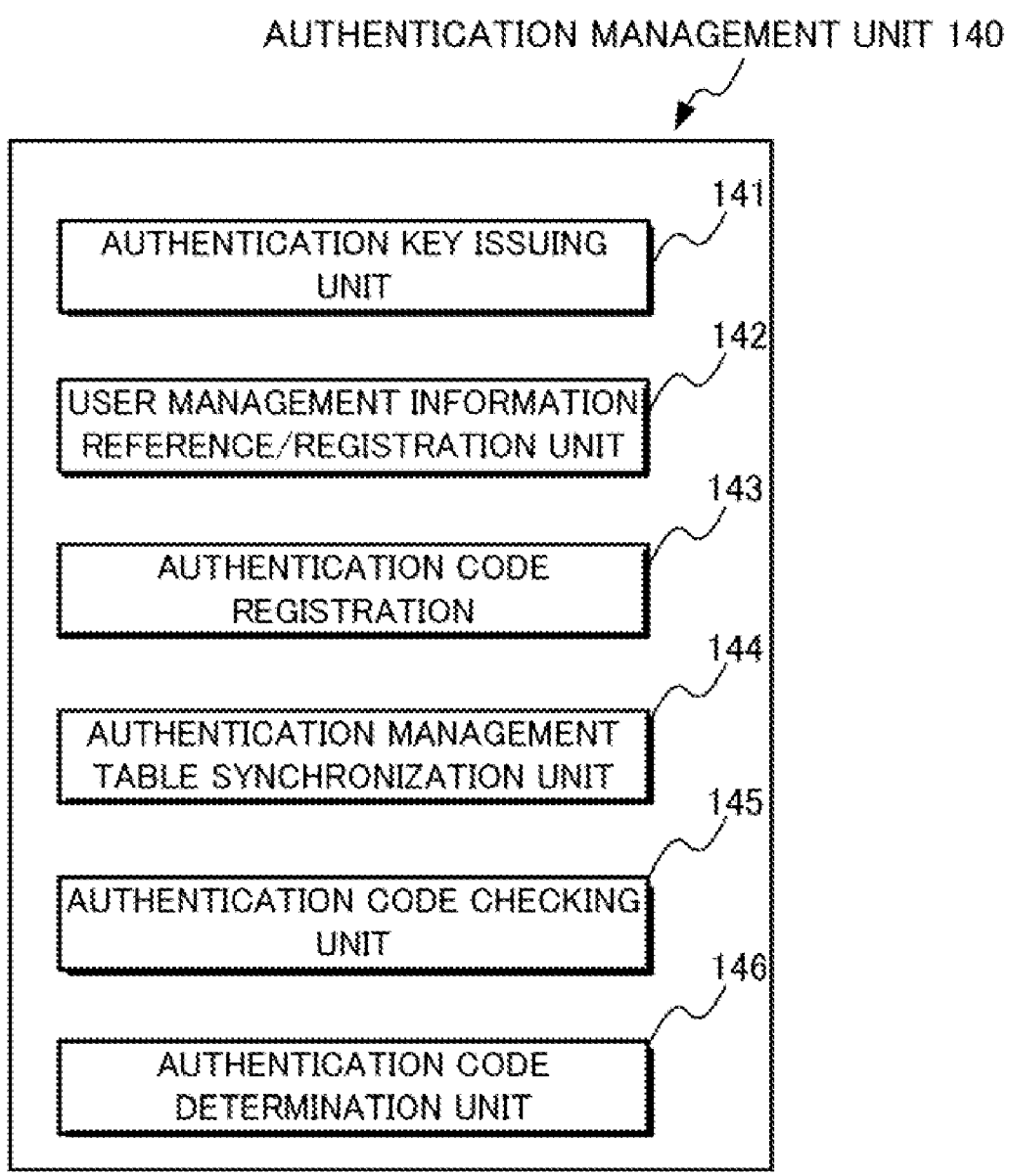
FIG. 4 is a block diagram showing a structure, which is expanded into functions, of a program executed by an authentication management unit of the authentication device according to the first exemplary embodiment of the present invention.

FIG. 4 shows a structure, which is expanded into functions, of a program executed by the authentication management unit 140. As shown in FIG. 4, the authentication management unit 140 includes an authentication key issuing unit 141, a user management information reference/registration unit 142, the authentication code registration unit 143, an authentication management table synchronization unit 144, an authentication code checking unit 145 and an authentication code determination unit 146.

With reference to FIG. 4, in the authentication management unit 140, at the time of user registration information change by the system management software 50 and the Web client 60 or at the time of authentication code new addition or change, processing of newly adding or changing user information is executed by the user management information reference/registration unit 142. In addition, a synchronization notification is made by the authentication management table synchronization unit 144 for sharing the same data by the entire platform of the authentication management tables 130 in the plurality of BMC boards. The authentication management unit 140 having received the notification synchronizes the authentication management tables 130 for sharing the same user information and authentication code among the respective BMC boards by using the internal LAN 30.

At the time of an authentication key issuing request from the system management software 50, in the authentication management unit 140, an authentication key as a random character string is generated by the authentication key issuing unit 141, which authentication key generated here is returned to the system management software 50.

At the time of a GET request to an authentication page in the Web server 112 from the Web client 60, the Web server 112 causes the authentication key issuing unit 141 to generate an authentication key formed of a random character string through the BMC firmware 111 and returns the generated authentication key to the Web client 60.

After receiving the authentication key, at the time of an authentication request to the BMC firmware 111, the system management software 50 causes an authentication code calculation unit 502 to calculate a hash value from a user account, a password and an authentication key obtained by the BMC firmware 111 as a response at the time of an authentication key issuing request and transmits the user account, the password and the authentication code to the BMC firmware 111.

At the time of input of a user account and a password by a user on an authentication page, the Web client 60 causes an authentication code calculation unit 601 to calculate a hash value from a user account, a password and an authentication key obtained by the BMC firmware 111 as a response at the time of an authentication key issuing request. Then, to the Web server 112, transmit the user account, the password and the authentication code.

The BMC firmware 111 or the Web server 112 having received the user account, the password and the authentication code attached to the authentication request from the system management software 50 and the Web client 60 hands over the user account, the password and the authentication code to the authentication management unit 140 to make an authentication request.

For determining whether the user account transmitted at the time of the authentication request is already registered or not, the authentication management unit 140 causes the user management information reference/registration unit 142 to check whether it is a user account already registered and when it is a user account already registered, causes the authentication determination unit 146 to calculate a hash value by using the registered user account, a password and an authentication key.

Then, the authentication determination unit 146 determines whether the authentication code transmitted at the time of an authentication request is the same as the calculated authentication code. Here, when the transmitted authentication code and the calculated authentication code are the same, allow authentication, as well as preserving the calculated authentication code in the authentication code management table 132 corresponding to the user by means of the authentication code registration unit 143. Simultaneously, the authentication management unit 140 synchronizes the authentication management tables 130 by means of the authentication management table synchronization unit 144 in order to share the same user information and authentication code among the BMC firmware of the respective BMC boards by using the internal LAN 30.

Figure 5:
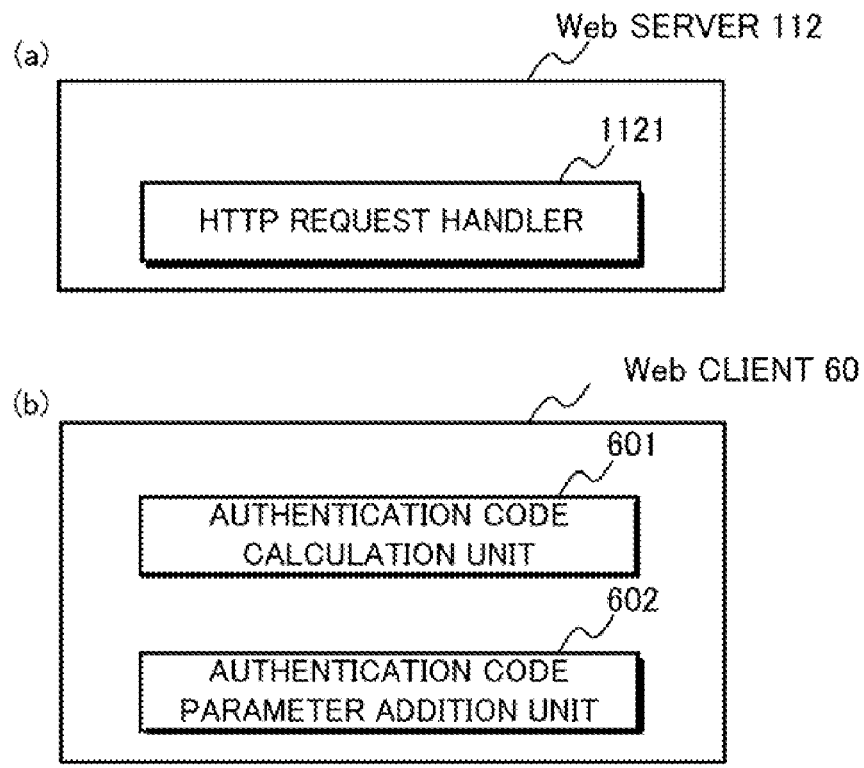
FIG. 5 is a block diagram showing a structure, which is expanded into functions, of a program executed by a Web server of the server system according to the first exemplary embodiment of the present invention.

FIG. 5(*a*) shows a structure of a program executed by the Web server and FIG. 5(*b*) shows a structure of a program executed by the Web client, both of which are expanded into functions.

As shown in FIG. 5(*a*), the program executed by the Web server 112 includes an HTTP request handler 1121 and the program executed by the Web client 60 includes the authentication code calculation unit 601 and an authentication code parameter addition unit 602. Function of each block will be described later.

Figure 6:
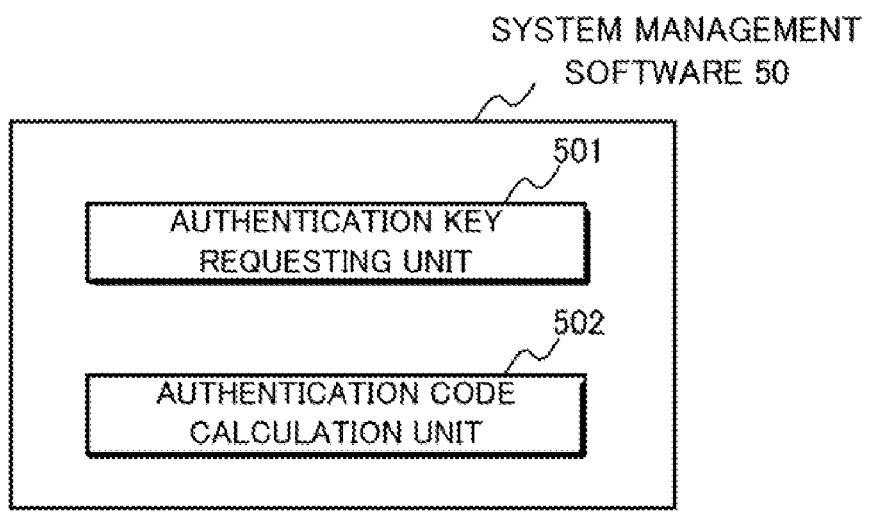
FIG. 6 is a block diagram showing a structure, which is expanded into functions, of a program executed by a host device of the server system according to the first exemplary embodiment of the present invention.

Shown in FIG. 6 is a structure, which is expanded into functions, of the system management software 50 executed by a host device. As shown in FIG. 6, the system management software 50 executed by the host device includes an authentication key requesting unit 501 and the authentication code calculation unit 502. Function of each block will be described later.

With reference to FIG. 5 and FIG. 6, for obtaining partition information about different partitions, the Web client 60 first accesses other partition in a hyperlink of a Web server of a different partition. At this time, by the authentication code parameter addition unit 602, add an authentication code as a query parameter of an HTTP GET request (hereinafter, simply referred to as a GET request) to issue a GET request to a Web server of other partition.

A Web server 222 on the side having received the GET request causes the HTTP request handler 1121 to read the authentication code added as a query parameter of the GET request at an access by a hyper link between different partitions and the authentication code checking unit 145 of the authentication management unit 140 checks whether it is an authentication code already registered and an appropriate authentication code.

Next, the authentication management unit 140 causes the authentication determination unit 146 to determine whether to allow authentication or not and when it is already authenticated, allow an access by a hyperlink and when it is yet to be registered and fails to be considered as an appropriate authentication code, return a response of an access refusal to the GET request.

Operation of the First Exemplary Embodiment

In the following, description will be made of operation of the authentication device according to the present exemplary embodiment in detail with reference to the flow chart of FIG. 8.

First, description will be made of a case where the system management software 50 executed by a host device executes authentication to the BMC firmware 111 of the BMC board #0(110). At the time of an authentication key issuing request from the authentication key requesting unit 501 (FIG. 6) of the system management software 50, the BMC firmware 111 generates an authentication key as a random character string by means of the authentication key issuing unit 141 of the authentication management unit 140 and returns the generated authentication key to the system management software 50.

The system management software 50 calculates a hash value, as an authentication request to the BMC firmware 111, from a user account and a password managed by the system management software 50 and an authentication key already obtained from the Web server 112 and transmits the user account and the password with the authentication code added.

At the time of a GET request to an authentication page in the Web server 112 made by the Web client 60, the Web server 112 generates an authentication key formed of a random character string by means of the authentication key issuing unit 141 of the authentication management unit 140 through the BMC firmware 111 and returns the generated authentication key to the Web client 60.

Upon input of a user account and a password on the authentication page of the Web server 112, the Web client 60 calculates a hash value from the user account and the password and the authentication key already obtained from the Web server 112. Then, transmit the user account and the password with the authentication code calculated at the time of transmission to the Web server 112 added.

With reference to FIG. 8, at the time of an authentication request from the system management software 50 or user's input of a user account and a password on the authentication page of the Web server 112 ("Yes" at Step S801), for determining whether a user account transmitted at the time of the authentication request is already registered or not, the authentication management unit 140 checks by means of the user management information reference/registration unit 142 whether it is a user account already registered (Step S802). Here, when it is a user account already registered ("Yes" at Step S802), the authentication determination unit 146 calculates a hash value by using the registered user account, password and authentication key (Step S803).

Next, the authentication management unit 140 determines by means of the authentication determination unit 146 whether the authentication code transmitted at the time of the authentication request is the same as the calculated authentication code (Step S804). When the authentication code transmitted from the system management software 50 or the Web client 60 and the authentication code calculated here are the same ("Yes" at Step S804), the authentication management unit 140 allows authentication, as well as preserving the calculated authentication code in the authentication code management table 132 corresponding to the user by means of the authentication registration unit 143 (Step S805). At the same time, for sharing the same user information and authentication code among BMC firmware of the respective BMC boards by using the internal LAN 30, the authentication management unit 140 synchronizes the authentication management tables 130 by means of the authentication management table synchronization unit 144 (Step S806).

Next, at the time of accessing a Web page of other partition from a Web page for an arbitrary partition by a hyperlink, the Web client 60 adds an authentication code to a query option of a GET request and transmits an obtained HTTP access request to the Web server 112. At the time of reception of the GET request, the Web server 112 analyzes an authentication code added to the query option by means of the HTTP request handler 1121 (FIG. 5(*a*)) and transfers the obtained result to the authentication management unit 140 via the BMC firmware 111.

The authentication management unit 140 having received the code ("Yes" at Step S807) checks by means of the authentication code checking unit 145 whether the transferred authentication code is an authentication code already registered and an appropriate authentication code (Step S808). The authentication management unit 140 decides whether to allow authentication by means of the authentication determination unit 146 and transmits the result to the Web server 112. When it is already authenticated ("Yes" at Step S808), the Web server 112 allows an access in a hyperlink (Step S809) and when it is not already registered and fails to be considered as an appropriate code ("No" at Step S808), returns a response of an access refusal to the HTTP request (Step S810).

On the other hand, when transmitting a user account and a password at the time of an authentication request to the BMC firmware 111, the system management software 50 calculates a hash value from the user account, the password and an authentication key returned as a response to an authentication key response request from the BMC firmware 111. Then, add the user account, the password and the calculated authentication code and transmit an obtained result to the BMC firmware 111. Thereafter, the system management software 50 adds an authentication code at the time of an access (at the time of a command request) to the BMC firmware 111.

The BMC firmware 111 analyzes the added authentication code and hands over a result to the authentication management unit 140 via the BMC firmware 111. The authentication management unit 140 responsively checks by means of the authentication code checking unit 145 whether it is an already registered authentication code and an appropriate authentication code and determines whether to allow authentication by means of the authentication determination unit 146 (Step S808). When the determination is here made that it is already authenticated ("Yes" at Step S808), allow an access in a hyperlink (Step S809) and when it is yet to be registered and therefore fails to be considered as an appropriate authentication code, return a response of an access refusal to an access request (Step S810).

Effects of the First Exemplary Embodiment

The authentication device according to the present exemplary embodiment attains the following effects. First effect is realizing, in the server system 1 operating on at least one BMC board mounted on each of a plurality of cell boxes, single sign-on with respect to an access from the system management software 50 or the Web client 60, thereby enhancing operation facility of user's operation.

The reason is that the BMC boards #0(110) and #1(120) hold an authentication result of a client to be authenticated or an account to be authenticated, execute synchronization of authentication information between Web servers and execute authentication management processing of skipping authentication in a hyperlink access between the Web servers.

Second effect is that authentication is enabled by single sign-on even without externally providing a dedicated authentication server and because consistency of user information is maintained via a network (here, the internal LAN 30, the external LAN 40), tapping or alteration can be prevented.

The functions that the authentication management unit 140 shown in FIG. 3 has may be realized all in software or at least a part of them may be realized in hardware. The data processing, which is executed by the authentication management unit 140, of holding an authentication result of a client to be authenticated or an account to be authenticated in the storage unit 70 to synchronize authentication information between the Web servers and skip authentication in a hyperlink access between the Web servers may be realized on a computer by one or a plurality of programs or at least part of it may be realized in hardware.

Although the present invention has been described with respect to the preferred exemplary embodiment and mode of implementation in the foregoing, the present invention is not necessarily limited to the above-described exemplary embodiment and mode of implementation and can be implemented in various modifications without departing from the scope of their technical ideas.

The whole or part of the exemplary embodiments disclosed above can be described as, but not limited to, the following supplementary notes.

(Supplementary note 1) An authentication device of a server system including at least one Web server operable on a baseboard management controller mounted on a cell box, comprising:

a storage unit in which authentication information is held; and an authentication management unit which holds an authentication result of a client to be authenticated or an account to be authenticated in said storage unit and synchronizes said authentication information between said Web servers to skip said authentication in a hyperlink access between said Web servers.

(Supplementary note 2) The authentication device according to Supplementary note 1, wherein when an access request to said baseboard management controller is made by a host device connected via a network, said authentication management unit collates a user account transmitted from said host device and the authentication information held in said storage unit to allow or refuse said access according to a result of said collation and skip said authentication for an access request once allowed from the host device.

(Supplementary note 3) The authentication device according to Supplementary note 1, wherein said authentication management unit, when an access request is made to said Web server by a client terminal connected via a network, said authentication management unit collates a user account transmitted from said client terminal and the authentication information held in said storage unit to allow or refuse an access according to a result of said collation.

(Supplementary note 4) A server system, comprising:

a host device which executes platform control through authentication;

a client terminal which accesses a Web server; and a Web server operable on a baseboard management controller mounted on a cell box connected with said host device and said client terminal via a network, wherein said baseboard management controller comprising:

a storage unit in which authentication information is held; and an authentication management unit which holds an authentication result of a client to be authenticated or an account to be authenticated in said storage unit and synchronizes said authentication information between said Web servers to skip said authentication in a hyperlink access between said Web servers.

(Supplementary note 5) The server system according to Supplementary note 4, wherein when an access request to said baseboard management controller is made by the host device connected via a network, said authentication management unit collates a user account transmitted from said host device and the authentication information held in said storage unit to allow or refuse said access according to a result of said collation and skip said authentication for an access request once allowed from the host device.

(Supplementary note 6) The server system according to Supplementary note 4, wherein said authentication management unit, when an access request is made to said Web server by the client terminal connected via a network, said authentication management unit collates a user account transmitted from said client terminal and the authentication information held in said storage unit to allow or refuse an access according to a result of said collation.

(Supplementary note 7) A method of authenticating a server between a plurality of cells in a server system including a host device which executes platform control, a client terminal which accesses a Web server, and a Web server operable on a baseboard management controller mounted on a cell box connected with said host device and said client terminal via a network, comprising:

a requesting step of issuing an access request to said baseboard management controller or Web server by said host device or client terminal;

a synchronization step of holding an authentication result of a client to be authenticated or an account to be authenticated to synchronize said authentication information between said Web servers by said baseboard management controller; and an authentication management step of skipping said authentication in a hyperlink access between said Web servers by said baseboard management controller.

(Supplementary note 8) The method of authenticating a server between a plurality of cells according to Supplementary note 7, wherein said authentication management step includes a sub-step of collating a user account transmitted from said host device and said authentication information held, and a sub-step of allowing or refusing said access according to a result of said collation to skip said authentication for an access request once allowed from the host device.

(Supplementary note 9) The method of authenticating a server between a plurality of cells according to Supplementary note 7, wherein said authentication management step includes a sub-step of collating a user account transmitted from said client terminal and said authentication information held, and a sub-step of allowing or refusing an access according to a result of said collation.

(Supplementary note 10) An authentication program for authenticating a server between a plurality of cells in a server system including a host device which executes platform control, a client terminal which accesses a Web server, and at least one Web server operable on a baseboard management controller mounted on a cell box connected with said host device and said client terminal, which causes a computer to execute a synchronization processing of holding an authentication result of a client to be authenticated or an account to be authenticated to synchronize said authentication information between said Web servers, and an authentication management processing of skipping said authentication in a hyperlink access between said Web servers.

(Supplementary note 11) The authentication program according to Supplementary note 10, wherein in said authentication management processing, when an access request to said baseboard management controller is made by the host device connected via a network, a user account transmitted from said host device and said authentication information held are collated to allow or refuse said access according to a result of said collation and skip said authentication for an access request once allowed from the host device.

(Supplementary note 12) The authentication program according to Supplementary note 11, wherein in said authentication management processing, when an access request is made to said Web server by the client terminal connected via a network, a user account transmitted from said client terminal and said authentication information held are collated to allow or refuse an access according to a result of said collation.

What is claimed is:

1. An authentication device of a server system comprising a host device which executes platform control through authentication, a client terminal which makes an access to a Web server, and a cell box connected to said host device and said client terminal through a network and including a plurality of baseboard management controllers having said Web server, a BMC firmware which controls the baseboard management controller, an authentication code management table which holds an authentication code, and the authentication device, comprising:

an authentication key issuing unit which issues an authentication key in response to an authentication key issuing request from said host device or said client terminal;

an authentication determination unit which allows authentication when in an access authentication request to said BMC firmware or said Web server from said host device or said client terminal, an authentication code attached to the access authentication request and an authentication code calculated using a user account and a password related to the access authentication request and said authentication key issued are coincident;

an authentication code registration unit which registers an authentication code related to said access authentication request to which authentication is allowed at said authentication code management table; and an authentication management table synchronization unit which synchronizes said authentication code management table with the authentication device on other said baseboard management controller, wherein said authentication determination unit skips authentication when an authentication code attached to said access authentication request is registered at said authentication code management table.

2. The authentication device according to claim 1, further comprising:

a user account determination unit which, when an access request is made to said baseboard management controller from said host device, collates a user account transmitted from said host device and information held in a user management table which holds predetermined information related to a user to determine whether the user account is a user account registered in advance, wherein said authentication determination unit starts said authentication when the user account is already registered at said user management table.

3. The authentication device according to claim 1, further comprising:

a user account determination unit which, when an access request is made to said Web server from said client terminal, collates a user account transmitted from said client terminal and information held in a user management table which holds predetermined information related to a user to determine whether the user account is a user account registered in advance, wherein said authentication determination unit starts said authentication when the user account is already registered at said user management table.

4. A server system, comprising:
a host device which executes platform control through authentication;
a client terminal which makes an access to a Web server; and
a cell box connected to said host device and said client terminal through a network and including a plurality of baseboard management controllers; wherein
said baseboard management controller including
said Web server, a BMC firmware which controls said baseboard management controller, an authentication code management table which holds an authentication code and an authentication device, wherein
said authentication device includes
an authentication key issuing unit which issues an authentication key in response to an authentication key issuing request from said host device or said client terminal,
an authentication determination unit which allows authentication when in an access authentication request to said BMC firmware or said Web server from said host device or said client terminal, an authentication code attached to the access authentication request and an authentication code calculated using a user account and a password related to the access authentication request and said authentication key issued are coincident,
an authentication code registration unit which registers an authentication code related to said access authentication request to which authentication is allowed at said authentication code management table, and
an authentication management table synchronization unit which synchronizes said authentication code management table with the authentication device on other said baseboard management controller, and wherein
said authentication determination unit
skips authentication when an authentication code attached to said access authentication request is registered at said authentication code management table.

5. An authentication method of an authentication device in a server system comprising a host device which executes platform control through authentication, a client terminal which makes an access to a Web server, and a cell box connected to said host device and said client terminal through a network and including a plurality of baseboard management controllers having said Web server, a BMC firmware which controls the baseboard management controller, an authentication code management table which holds the authentication code, and an authentication device, comprising:
an authentication key issuing step of issuing an authentication key in response to an authentication key issuing request from said host device or said client terminal;
an authentication determination step of allowing authentication when in an access authentication request to said BMC firmware or said Web server from said host device or said client terminal, an authentication code attached to the access authentication request and an authentication code calculated using a user account and a password related to the access authentication request and said authentication key issued are coincident;
an authentication code registration step of registering an authentication code related to said access authentication request to which authentication is allowed at said authentication code management table; and
an authentication management table synchronization step of synchronizing said authentication code management table with the authentication device on other said baseboard management controller, wherein
at said authentication determination step,
authentication is skipped when an authentication code attached to said access authentication request is registered at said authentication code management table.

6. The authentication method according to claim 5, further comprising:
an user account determination step of, when an access request is made to said baseboard management controller from said host device, collating a user account transmitted from said host device and information held in a user management table which holds predetermined information related to a user to determine whether the user account is a user account registered in advance, wherein
at said authentication determination step,
said authentication is started when the user account is already registered at said user management table.

7. The authentication method according to claim 5, further comprising:
an user account determination step of, when an access request is made to said Web server from said client terminal, collating a user account transmitted from said client terminal and information held in a user management table which holds predetermined information related to a user to determine whether the user account is a user account registered in advance, wherein
at said authentication determination step,
said authentication is started when the user account is already registered at said user management table.

8. In a server system comprising a host device which executes platform control through authentication, a client terminal which makes an access to a Web server, and a cell box connected to said host device and said client terminal through a network and including a plurality of baseboard management controllers having said Web server, a BMC firmware which controls the baseboard management controller, an authentication code management table which holds an authentication code, and an authentication device, an authentication program stored on a non-transitory computer readable medium and executed on a computer functioning as said authentication device, which causes said computer to execute:
an authentication key issuing processing of issuing an authentication key in response to an authentication key issuing request from said host device or said client terminal;
an authentication determination processing of allowing authentication when in an access authentication request to said BMC firmware or said Web server from said host device or said client terminal, an authentication code attached to the access authentication request and an authentication code calculated using a user account and a password related to the access authentication request and said authentication key issued are coincident;
an authentication code registration processing of registering an authentication code related to said access authentication request to which authentication is allowed at said authentication code management table; and
an authentication management table synchronization processing of synchronizing said authentication code management table with the authentication device on other said baseboard management controller, wherein
in said authentication determination processing, authentication is skipped when an authentication code attached to said access authentication request is registered at said authentication code management table.

9. The authentication program according to claim 8, which further causes said computer to execute:

an user account determination processing of, when an access request is made to said baseboard management controller from said host device, collating a user account transmitted from said host device and information held in a user management table which holds predetermined information related to a user to determine whether the user account is a user account registered in advance, wherein in said authentication determination processing, said authentication is started when the user account is already registered.

10. The authentication program according to claim 8, which further causes said computer to execute an user account determination processing of, when an access request is made to said Web server from said client terminal, collating a user account transmitted from said client terminal and information held in a user management table which holds predetermined information related to a user to determine whether the user account is a user account registered in advance, wherein in said authentication determination processing, said authentication is started when the user account is already registered.

* * * * *